United States Patent
Swarte et al.

(10) Patent No.: US 10,161,118 B2
(45) Date of Patent: *Dec. 25, 2018

(54) FAUCET

(71) Applicant: Kohler Co., Kohler, WI (US)

(72) Inventors: Gregory de Swarte, Sheboygan, WI (US); Rafael Rexach, Sheboygan, WI (US); John Esche, Kohler, WI (US); Brad Raymond Hadfield, Port Washington, WI (US)

(73) Assignee: KOHLER CO., Kohler, WI (US)

( * ) Notice: Subject to any disclaimer, the term of this patent is extended or adjusted under 35 U.S.C. 154(b) by 21 days.

This patent is subject to a terminal disclaimer.

(21) Appl. No.: 15/182,918

(22) Filed: Jun. 15, 2016

(65) Prior Publication Data

US 2016/0298320 A1 Oct. 13, 2016

Related U.S. Application Data

(63) Continuation of application No. 14/554,948, filed on Nov. 26, 2014, now Pat. No. 9,464,415.

(51) Int. Cl.
*E03C 1/04* (2006.01)
*F16K 11/085* (2006.01)
*E03C 1/02* (2006.01)

(52) U.S. Cl.
CPC .......... *E03C 1/0404* (2013.01); *E03C 1/0403* (2013.01); *E03C 1/0412* (2013.01); *F16K 11/085* (2013.01); *E03C 2001/026* (2013.01); *E03C 2001/0414* (2013.01)

(58) Field of Classification Search
CPC .... E03C 1/0404; E03C 1/0403; E03C 1/0412; E03C 2001/0414; E03C 2001/026; F16K 11/085
See application file for complete search history.

(56) References Cited

U.S. PATENT DOCUMENTS

| | | | |
|---|---|---|---|
| 28,221 A | 5/1860 | Warrent | |
| 555,033 A | 2/1896 | Beaumont | |
| 577,264 A | 2/1897 | Lloyd | |
| 1,461,958 A | 7/1923 | Arnold | |
| 1,640,945 A * | 8/1927 | Leibing | B67D 1/0027 137/606 |
| 3,390,897 A | 7/1968 | Moore | |
| D213,193 S | 1/1969 | Martin et al. | |
| 3,479,068 A | 11/1969 | Brittain | |
| 3,580,615 A | 5/1971 | Prosser | |
| 3,767,234 A | 10/1973 | Weirich et al. | |
| 3,822,074 A | 7/1974 | Welcker | |
| 4,076,279 A | 2/1978 | Klotz et al. | |
| 4,105,226 A | 8/1978 | Frey et al. | |

(Continued)

*Primary Examiner* — William McCalister
*Assistant Examiner* — Patrick Williams
(74) *Attorney, Agent, or Firm* — Foley & Lardner LLP

(57) ABSTRACT

A faucet includes a spout base having a first end mounted to a mounting surface and a second end opposite the first end that includes an elbow, more than one water supply line within the spout base, and a hub containing a mixing valve. The hub includes an inlet end and an outlet end. The second end of the spout base and the inlet end of the hub connect together. The inlet end of the hub connects to the water supply lines. The mixing valve is approximately midway between the elbow and a dispensing end of the faucet.

20 Claims, 10 Drawing Sheets

(56) References Cited

U.S. PATENT DOCUMENTS

| | | |
|---|---|---|
| 4,191,408 A | 3/1980 | Acker |
| 4,378,124 A | 3/1983 | Weirich et al. |
| 4,690,436 A | 9/1987 | Hehl |
| 4,783,100 A | 11/1988 | Klein |
| 4,836,582 A | 6/1989 | Krause |
| 5,103,856 A | 4/1992 | Fleischmann |
| 5,161,838 A | 11/1992 | Ely et al. |
| 5,226,682 A | 7/1993 | Marrison et al. |
| 5,535,779 A | 7/1996 | Huang |
| 5,584,512 A | 12/1996 | Carstensen |
| D389,561 S | 1/1998 | Horge |
| 5,779,283 A | 7/1998 | Kimura et al. |
| 5,873,389 A | 2/1999 | Cheng |
| 6,301,727 B1 | 10/2001 | Bertrand |
| 6,321,755 B1 | 11/2001 | Egli |
| 6,321,788 B1 * | 11/2001 | Egli .............. E03C 1/0404 137/615 |
| 6,390,125 B2 * | 5/2002 | Pawelzik .......... F16K 11/0782 137/605 |
| 6,634,677 B2 | 10/2003 | Mehr |
| 6,796,544 B1 * | 9/2004 | Chen ................ F16K 31/605 137/625.17 |
| 6,830,072 B2 | 12/2004 | Gautschi et al. |
| D508,976 S | 8/2005 | Find et al. |
| 7,390,030 B2 | 6/2008 | Lamm |
| 7,681,927 B2 | 3/2010 | Olson |
| 7,766,043 B2 * | 8/2010 | Thomas ................ E03C 1/04 137/801 |
| 7,810,850 B2 | 10/2010 | O'Neill et al. |
| 7,954,225 B2 | 6/2011 | Webb |
| 8,371,768 B1 | 2/2013 | Wu |
| 8,397,364 B2 | 3/2013 | Webb |
| 2003/0178071 A1 | 9/2003 | Gautschi et al. |
| 2005/0138725 A1 * | 6/2005 | Hwang ............. E03C 1/0403 4/695 |

* cited by examiner

FAUCET

CROSS-REFERENCE TO RELATED APPLICATIONS

The present application is a Continuation of U.S. patent application Ser. No. 14/554,948, filed Nov. 26, 2014, the entire disclosure of which is incorporated by reference herein.

BACKGROUND

The present application relates generally to the field of faucets (e.g., kitchen faucets, bathroom faucets, etc.). The concepts disclosed herein have particular, but not exclusive, application to single-handle faucet assemblies. More particularly, the present application relates to an improved configuration for a faucet assembly in which a mixing valve is positioned approximately near a middle portion of a faucet spout, between an end which is mounted to a mounting surface and an end where water is dispensed from the faucet spout.

A single-handle faucet assembly, such as a kitchen faucet, may be coupled to a plurality of water supply lines (e.g., hot and cold water supply lines) which may be fluidly coupled to a mixing valve. Mixing valves are used to control the relative amounts of hot and cold water that flow through the faucet. The faucet handle of a single-handle faucet assembly is typically directly coupled to a mixing valve. Thus, the mixing valves and faucet handles in such a faucet are generally co-located. In other words, the position of a mixing valve will usually determine, at least to an extent, the location of the faucet handle.

Generally, mixing valves for single-handle faucets are positioned near a base of the spout (i.e., where the spout mounts to a mounting surface, such as a countertop or a sink). Positioning a mixing valve in such a location may provide various advantages, such as facilitating easier assembly of the mixing valve to the water supply lines. However, positioning a mixing valve near the base of the spout generally means that the faucet handle will be positioned near the base of the spout. It would be advantageous for some single-handle faucet applications to position the mixing valve and handle in a different location, for example, to improve the accessibility of the faucet handle. Improving the accessibility of the faucet handle may improve the ergonomics for certain tasks, such as dishwashing. For example, for sinks that are used more frequently (e.g., bar sinks, sinks in restaurants, etc.), it may be desirable to provide a single-handle faucet with a handle that is more easily accessible (e.g., in a location that is closer to a user). Also, for those users who may be less able to reach a base of a faucet spout (e.g., children, those who are physically handicapped, etc.), it may be desirable to provide a single-handle faucet with a handle that is closer to the dispensing end of the spout.

Water supply lines are coupled to mixing valves in various ways. In some applications, a clip may be used to couple a connector of a water supply line to a mixing valve. In other applications, a water supply line may be welded, soldered, threaded, or integrally formed to a mixing valve. Assembly of a faucet may be simplified if some elements satisfied multiple functions. Accordingly, it may be desirable to use a coupler that couples a water supply line or multiple water supply lines to a mixing valve, and also performs additional functions.

Accordingly, it would be advantageous to provide a single-handle faucet design that addresses one or more of the issues discussed above, that is relatively simple and efficient to manufacture, and is relatively easy to install. These and other advantageous features as discussed herein will be apparent to those reviewing the present disclosure.

SUMMARY

According to an exemplary embodiment, a faucet includes a spout base having a first end configured to be mounted to a mounting surface and a second end opposite the first end that comprises an elbow, a plurality of water supply lines received within the spout base, and a hub configured containing a mixing valve, the hub including an inlet end and an outlet end. The second end of the spout base and the inlet end of the hub are coupled together. The inlet end of the hub is configured to be coupled to the plurality of water supply lines.

According to another exemplary embodiment, a faucet includes a spout base having a first end and an opposite second end, and first and second water supply lines received within the spout body, each of the first and second water supply lines includes a first end having a connector, a hub including an inlet end, an outlet end, an aperture provided within a side wall proximate the inlet end, and an inlet port for each water supply line, each inlet port provided within the inlet end and configured to receive the connector of one water supply line, and a pin. The pin is located within the aperture and engages a portion of the connectors of the first and second water supply lines and secures the connectors to the hub.

According to another exemplary embodiment, a faucet includes a plurality of water supply lines, a hub including an aperture disposed through a side wall of the hub, the hub also including a plurality of inlet ports, each inlet port being in fluid communication with a water supply line, a spout outlet coupled to the hub, the spout outlet including an outlet hole, a pin, and a plug configured to block the outlet hole so as to prevent any water contained within the hub from flowing through the outlet hole at an inlet end of the hub. The aperture extends from the side wall of the hub to the outlet hole. When the plug is received within the outlet hole, the pin is received within the aperture to secure the plug within the outlet hole.

DETAILED DESCRIPTION

As discussed above, there are certain shortcomings in the field of known faucet designs, and in particular, for single-handle faucet designs. In single-handle faucet assemblies, the faucet handle is typically directly coupled to a mixing valve. Thus, the location of a mixing valve may affect the location of the faucet handle, at least in part. The mixing valves of single-handle faucets are generally positioned near a base of a faucet spout, proximately near an end of the spout that is mounted to a mounting surface (e.g., a countertop, a sink deck, etc.). Thus, the faucet handle for such faucets is generally positioned near a base of the faucet spout. It may be desirable to provide a single-handle faucet assembly in which the mixing valve and the handle are positioned closer to a dispensing end of the faucet spout. In particular, it may be desirable to position a mixing valve and a handle at or near a middle portion of the spout, to provide more convenient access to the handle, and to improve the ergonomics of the faucet assembly. The present application discloses various embodiments intended to address one or more of these deficiencies, as will be discussed in greater detail below.

Figure 2:
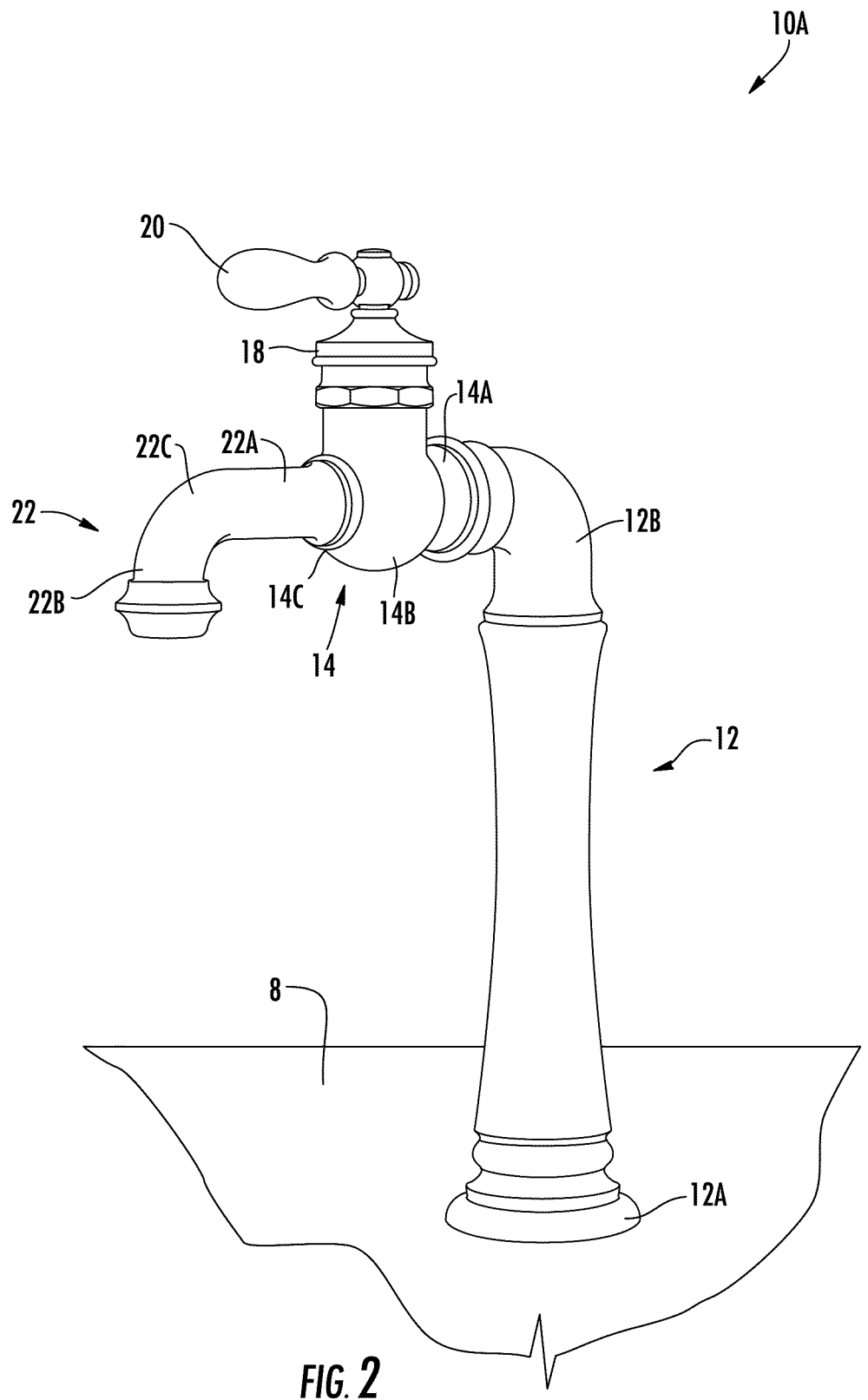
FIG. 2 is a perspective view of a faucet assembly according to an exemplary embodiment.

Referring to FIG. 2, according to an exemplary embodiment, a single-handle faucet 10A is shown. A spout base 12 may be mounted to a horizontal mounting surface 8 (e.g., a countertop, sink deck, etc.) in any suitable manner. As shown, the spout base 12 extends upwards from a base end 12A that is configured to be mounted to the mounting surface 8. The spout base 12 is generally hollow, and is configured to contain a pair of water supply lines 26 therein (not shown in FIG. 2, but see, e.g., FIG. 3). Opposite the base end 12A, the spout base 12 is shown to includes an elbow 12B that travels through ninety degrees. According to an exemplary embodiment, the spout base 12 does not include a mixing valve therein.

Figure 3:
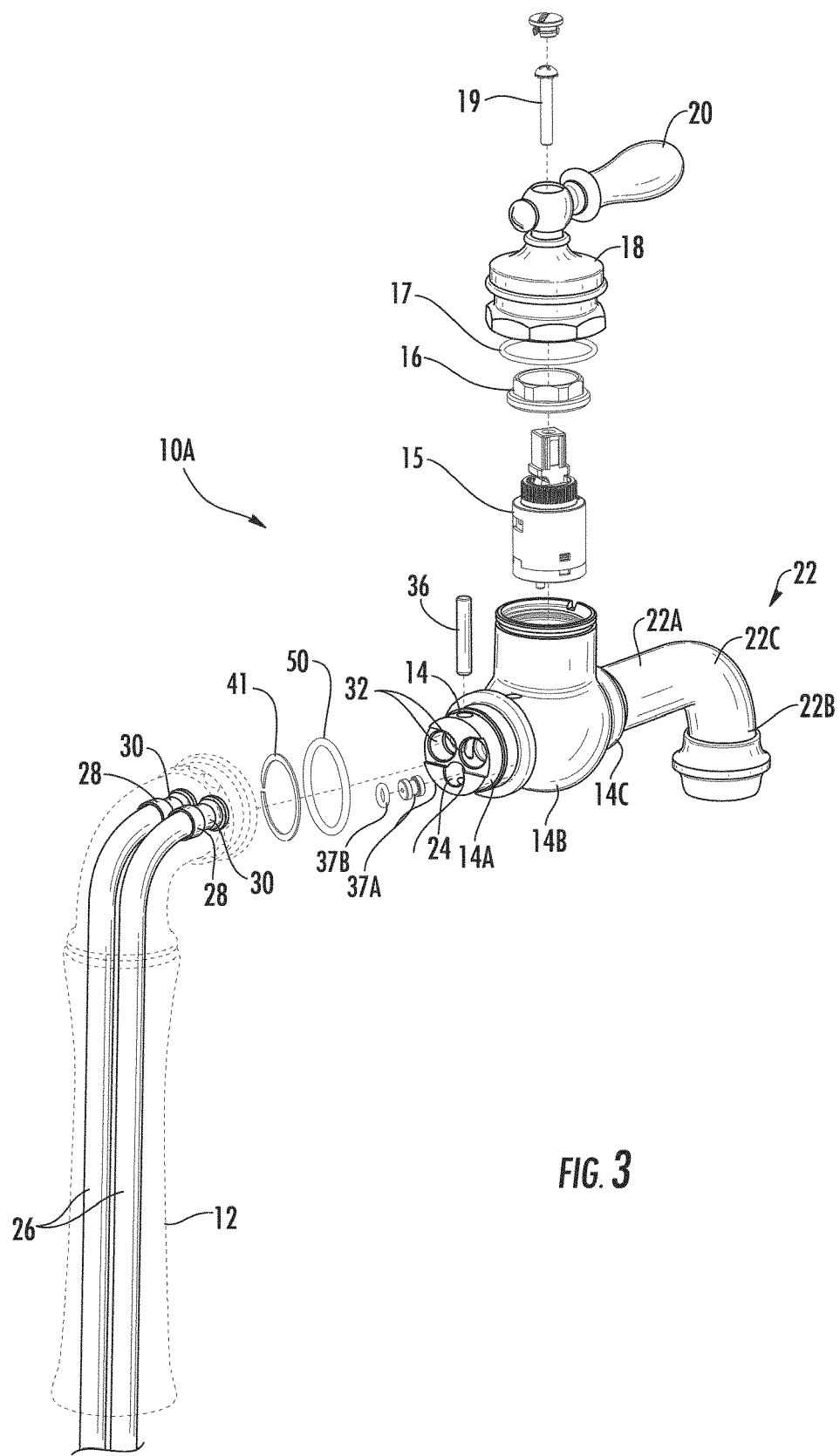
FIG. 3 is a partially exploded perspective view of the faucet assembly shown in FIG. 2.

Referring to FIGS. 2-3, a hub 14 is shown as being coupled to the elbow 12B of the spout base 12. The hub 14 includes a first, rear end 14A that is configured to be coupled to the elbow 12B of the spout base 12. Various methods of coupling the first end 14A of the hub 14 to the spout base 12 will be described below, with reference to FIG. 3.

The hub 14 is shown to include an enlarged or bulbous portion 14B which is configured to accommodate (e.g., contain, house, receive, etc.) a valve cartridge 15 (e.g., a mixing valve) therein. For example, a top portion of the bulbous portion 14B includes a bore 13. The bore 13 is configured to receive the valve cartridge 15. A fastener 16 (e.g., a nut) may be used to secure or hold the valve cartridge 15 within the hub 14. For example, an opening of the bore 13 may include inner threads (female threads), and the fastener 16 may include corresponding outer threads (male threads). The valve cartridge 15 may be received within the bore 13, and the fastener 16 may be threadably coupled to the hub 14 to secure the valve cartridge 15 therein. According to another exemplary embodiment, the valve cartridge 15 may be coupled to the hub 14 in any suitable way (e.g., via bayonet mounting, via a snap ring, through an interference fit, etc.), and the methods disclosed herein are not intended to be limiting.

A seal member 17 (e.g., an o-ring, a gasket, etc.) may be provided between the valve cartridge 15 and the bore 13 to create a watertight seal therebetween. An escutcheon 18 may be coupled to a top portion of the fastener 16, and a faucet handle 20 may be coupled to a valve stem 15A of the valve cartridge 15 via a bolt 19 (e.g., a fastener, screw, etc.). The valve cartridge 15 may be controlled by pivoting or rotating the faucet handle 20 in a normal fashion, as explained below.

According to an exemplary embodiment, the valve cartridge 15 (e.g., mixing valve) is positioned approximately horizontally midway between the elbow 22C and a generally vertical portion of the spout base 12. In particular, according to an exemplary embodiment, the valve cartridge 15 may be positioned approximately horizontally midway between a generally vertical surface of the vertical portion 22B of the spout outlet 22 and a generally vertical surface of the spout base 12 between the base end 12A and the elbow 12B. Looking at the relative position of the valve cartridge 15 within the faucet 10A in another way, the valve cartridge 15 may be positioned approximately horizontally midway between a center of a dispensing end of the faucet 10A (e.g., a center of the vertical portion 22B of the spout outlet 22) and a center of a generally vertical portion of the spout base 12 according to an exemplary embodiment. Looking at the relative position of the valve cartridge within the faucet 10A in yet another way, according to an exemplary embodiment, the valve cartridge 15 may be positioned approximately horizontally midway between a center of the base end 12A of the spout base 12 (this also corresponds to a center of a mounting hole to which the faucet 10A is mounted to) and a center of a dispensing end of the faucet 10A.

By "approximately horizontally midway," we intend to mean within a section of the faucet that is horizontally centered between a "first end" (defined below) and a "second end" (defined below), the section comprising approximately 40% of a total horizontal length between the "first end" and the "second end," according to an exemplary embodiment. According to an exemplary embodiment, the "first end" is a generally vertical surface of the vertical portion 22B of the spout outlet 22, and the "second end" is a generally vertical surface of the spout base 12 between the base end 12A and the elbow 12B. According to another exemplary embodiment, the "first end" refers to a center of a dispensing end of the faucet 10A and the "second end" refers to a center of a generally vertical portion of the spout base 12. According to another exemplary embodiment, the "first end" refers to a center of the base end 12A of the spout base 12 (this also corresponds to a center of a mounting hole to which the faucet 10A is mounted to), and the "second end" refers to a center of a dispensing end of the faucet 10A.

According to other exemplary embodiments, "approximately horizontally midway" is intended to mean within a section of the faucet that is horizontally centered between the respective "first ends" and "second ends" described above, the section comprising approximately 30% of a total horizontal length between the respective "first ends" and "second ends." According to other exemplary embodiments, "approximately horizontally midway" is intended to mean within a section of the faucet that is horizontally centered between the respective "first ends" and "second ends" described above, the section comprising approximately 20% of a total horizontal length between the respective "first ends" and "second ends."

According to an exemplary embodiment, the spout base 12 and the hub 14 may be formed from a metal (e.g., zinc, aluminum, brass, etc.). According to other exemplary embodiments, any suitable material (e.g., plastic, composite, etc.) may be used to form the spout base 12 and the hub 14, and the materials disclosed herein are not intended to be limiting.

As shown in FIG. 2, the faucet handle 20 is positioned on a top portion of the hub 14. Although the faucet handle 20 is shown as being positioned on a top portion of the hub 14, it should be understood that the hub 14 may be configured so that the faucet handle is positioned on a left, right, or bottom side thereof. The faucet handle 20 operates in a normal fashion. For example, the faucet handle 20 can be rotated (e.g., pivoted) upward to open flow between the water supply lines 26 (not shown in FIG. 2, but see, e.g., FIG. 3) and the valve cartridge 15. The faucet handle 20 can also be rotated laterally (left or right) to adjust the relative amounts of hot and cold water able to flow between the water supply lines 26 and the mixing valve. To close or stop water flow between the water supply lines 26 and the mixing valve, the faucet handle 20 may be pivoted downward.

Figure 1A:
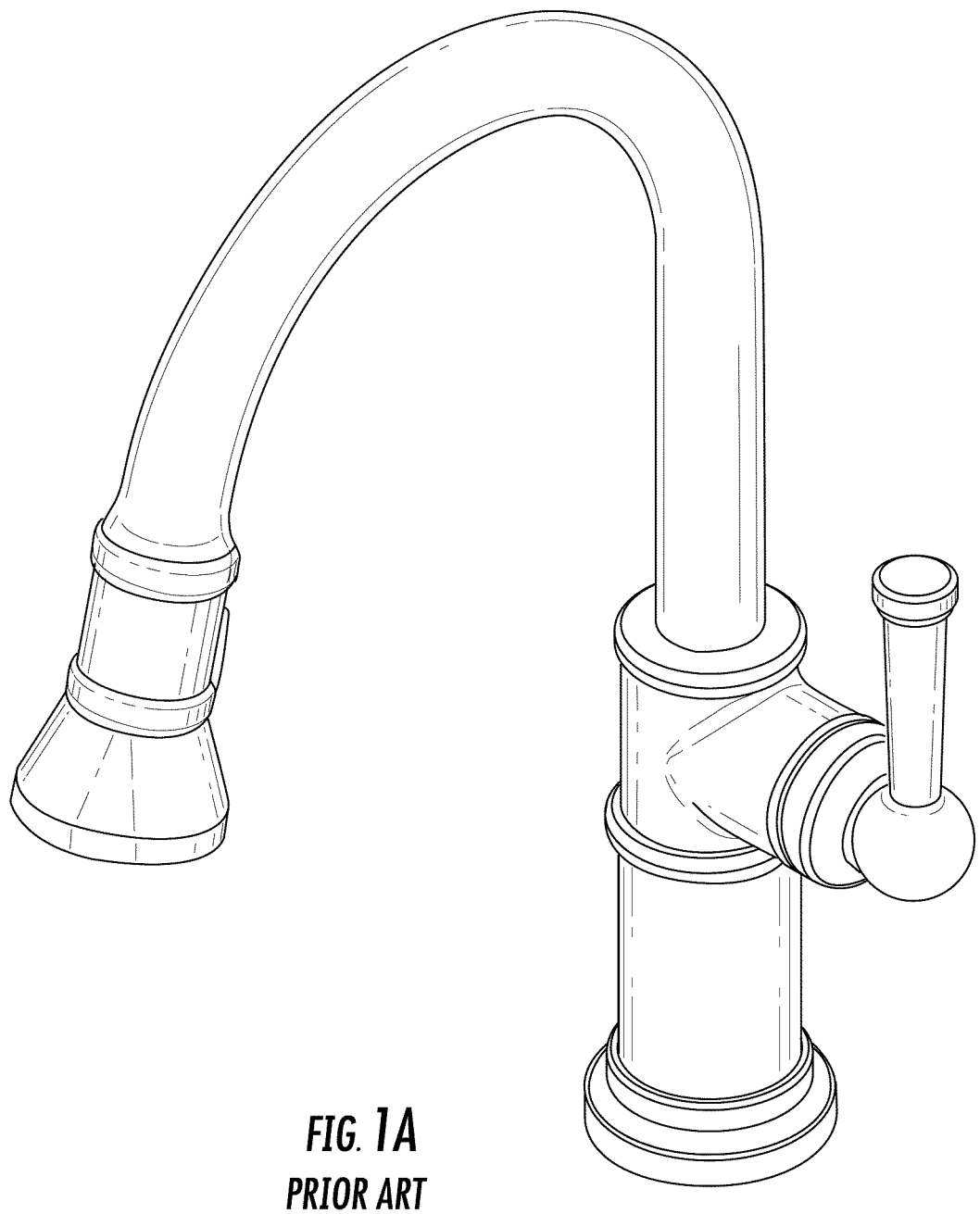
FIG. 1A is a perspective view of a prior art faucet.

Referring now to FIG. 1A, a prior art kitchen faucet is shown. The kitchen faucet shown in FIG. 1A includes a mixing valve that is proximately positioned near a mounting surface. The mixing valve within the faucet spout shown in FIG. 1A may or may not be generally linearly aligned with a mounting hole disposed within the mounting surface. That is, the mixing valve within the faucet spout shown is FIG. 1A may be somewhat off-set with a mounting hole.

The length of a faucet may be considered as the overall length (e.g., including linear and non-linear portions or sections) between where the faucet mounts to a mounting surface and where water is dispensed (e.g., into a sink, basin, receptacle, etc.). The mixing valve of the faucet shown in FIG. 1A is positioned closer (e.g., nearer, more proximate, etc.) to the mounting surface than to the end of the spout from which water is dispensed (e.g., the dispensing end). That is, the length between the dispensing end of the faucet and the mixing valve shown in FIG. 1A is greater than the length between the mixing valve and the mounting surface. More particularly, the length between the mixing valve of the faucet shown in FIG. 1A and the dispensing end may be approximately more than 70% of the overall length of the faucet. More particularly still, the length between the mixing valve of the faucet shown in FIG. 1A and the dispensing end may be approximately more than 80% of the overall length of the faucet. More particularly still, the length between the mixing valve of the faucet shown in FIG. 1A and the dispensing end may be approximately more than 90% of the overall length of the faucet. Faucet handles are generally co-located with a mixing valve (i.e., generally, the position of a mixing valve may determine, at least to an extent, the position of a faucet handle). Therefore, the location of a faucet handle for the faucet shown in FIG. 1A may be positioned further away from the dispensing end of the faucet than to the portion of the faucet spout which is mounted to a mounting surface.

Referring to FIG. 3, according to an exemplary embodiment, the position (e.g., location) of the valve cartridge 15 of the faucet 10A is configured to be closer to a dispensing end (e.g., a vertical portion 22B of a spout outlet 22) of the faucet 10A than to the base end 12A of the spout base 12. That is, a length between the dispensing end of the faucet 10A and the valve cartridge 15 is configured to be less than 50% of the overall length between the dispensing end of the faucet and the base end 12A. More particularly, according to an exemplary embodiment, a length between the dispensing end of the faucet 10A and the valve cartridge 15 is configured to be less than 40% of the overall length between the dispensing end of the faucet and the base end 12A. More particularly still, according to another exemplary embodiment, the length between the dispensing end of the faucet 10A and the valve cartridge 15 is configured to be less than 30% of the overall length between the dispensing end of the faucet and the base end 12A. More particularly still, according to another exemplary embodiment, the length between the dispensing end of the faucet 10A and the valve cartridge 15 is configured to be less than 20% of the overall length between the dispensing end of the faucet and the base end 12A. More particularly still, according to another exemplary embodiment, the length between the dispensing end of the faucet 10A and the valve cartridge 15 is configured to be less than 10% of the overall length between the dispensing end of the faucet and the base end 12A.

As described above, a faucet handle may be generally co-located with a mixing valve or valve cartridge. Thus, a faucet handle 20 of the faucet 10A is positioned generally above the valve cartridge 15. Advantageously, because the valve cartridge 15 is positioned closer to the dispensing end of the faucet 10A than to the base end 12A, the faucet handle 20 is more accessible to a user. That is, the faucet handle 20 is positioned closer to a user than the faucet handle shown in FIG. 1A, which is positioned closer to a base end of a faucet spout than to an opposite dispensing end. Accordingly, the ergonomics of accomplishing certain tasks (e.g., dishwashing) with the faucet 10A may be improved.

Figure 1B:
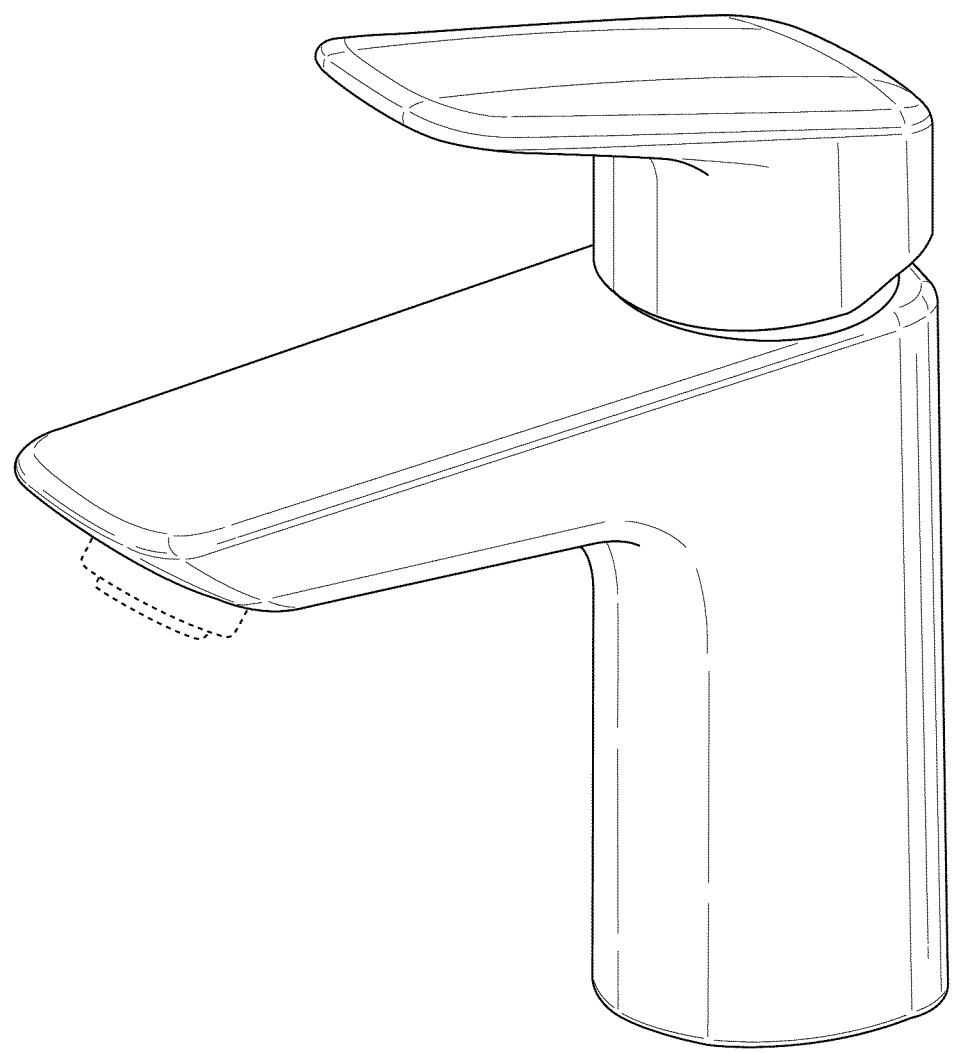
FIG. 1B is a perspective view of another prior art faucet.
Figure 1C:
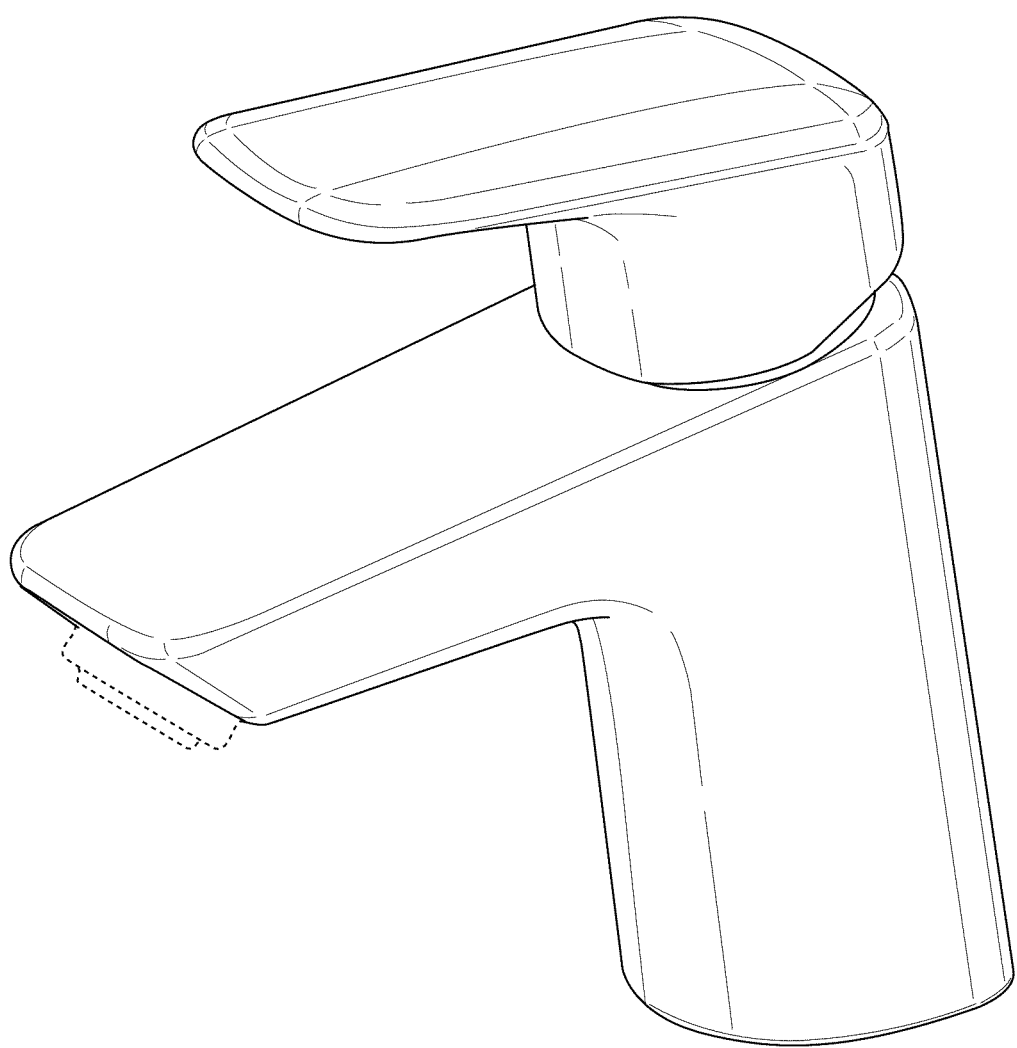
FIG. 1C is a perspective view of another prior art faucet.

Generally, mixing valves of bathroom faucets are linearly aligned with a mounting hole (i.e., a hole disposed within a mounting surface, which a bathroom faucet is mounted to). For example, referring to FIGS. 1B and 1C, two prior art faucets are shown in which a mixing valve is mounted within a spout body (e.g., a faucet spout, spout base, etc.) and the mixing valve is generally linearly aligned with a mounting hole. The position of the mixing valves of these faucets are typically dependent on the location of the mounting hole that the faucet is coupled to, as well as the length and angle at which the spout body extends from the mounting hole. As described above, faucet handles are generally co-located with a mixing valve (i.e., generally, the position of a mixing valve may determine, at least to an extent, the position of a faucet handle). Therefore, for a faucet design that includes a mixing valve which is generally linearly aligned with a mounting hole, the location of the faucet handle of such a faucet may depend on the length and angle at which a faucet spout extends from the mounting hole.

According to an exemplary embodiment, the position of the valve cartridge 15 is configured to be independent (i.e., not necessarily dependent) of the location of a mounting hole within a mounting surface. For example, according to an exemplary embodiment, the valve cartridge 15 is linearly aligned with a mounting hole within a mounting surface (e.g., a vertical mounting surface, wall, etc.). According to another exemplary embodiment, the valve cartridge 15 is not linearly aligned with a mounting surface (see, e.g., the faucet 10A of FIG. 2). Thus, whereas the location of mixing valves of some faucets (e.g., conventional bathroom faucets) may be generally dependent on the location of a mounting hole (such that the mixing valve is generally aligned with such mounting hole), the position of the valve cartridge 15 is not necessarily constrained to the position of a mounting hole within a mounting surface.

According to an exemplary embodiment, the faucet handle 20 is positioned forward of the spout base 12. When the faucet assembly 10A is mounted to the mounting surface 8, the faucet handle 20 is positioned sufficiently forward of any obstruction that may be rear the spout base 12 (e.g., a wall, a portion of the sink, a backsplash, items sitting on the mounting surface, etc.). Thus, a user may easily and quickly reach the faucet handle 20 without interfering with an obstruction behind, or in the vicinity of, the spout base 12. The hub 14 and the spout base 12 may be configured to provide a longer or shorter distance between the hub 14 and the spout base 12, to provide a desired distance between the faucet handle 20 and an obstruction behind the spout base 12. For example, the lengths of the elbow 12B of the spout base 12 or the first end 14A of the hub 14 may be configured to provide a desired distance between the faucet handle 20 and the spout base 12.

According to an exemplary embodiment, the hub 14 having the valve cartridge 15 may be configured to be coupled to a spout base 12 of any suitable height (i.e., a vertical distance between the base end 12A and the elbow 12B) and any suitable depth (a horizontal distance between the base end 12A and an end of the elbow 12 that couples to the first end 14A of the hub 14). For example, according to an exemplary embodiment, the height of a spout base could be greater or lesser than the height of the spout base 12 shown in the FIGURES, and the depth of a spout base could be greater or lesser than the depth of the spout base 12 shown in the FIGURES. According to another exemplary embodiment, the hub 14 and valve cartridge 15 are configured to couple to a spout base that is generally straight and does not include an elbow. For example, the hub 14 and the valve cartridge 15 may be configured to couple to a generally straight spout base which is configured to be coupled to a vertical mounting surface (e.g., a wall, portion of the sink, backsplash, etc.).

Conventional pot fillers may typically include a mixing valve positioned proximate a mounting surface (e.g., a wall), one or more pivotable spout sections coupled to the mixing valve, and a fluid control valve coupled near a dispensing end of the pot filler (e.g., proximate where water is dispensed to fill a pot, sink, etc.). Thus, to adjust the water temperature for a conventional pot filler, a user must be able to reach proximate where the pot filler is mounted to a mounting surface. It may be more difficult for some users (e.g., children, the elderly, those who are physically handicapped, etc.) to reach the handle for the mixing valve of a conventional pot filler.

According to an exemplary embodiment, a spout base may be comprised of one or more spout sections that are coupled together via one or more pivotable joints (e.g., couplers). For example, a spout base may be comprised of spout sections that are similar to the spout sections 40A, 40B shown in FIGS. 7-8. According to an exemplary embodiment, the hub 14 and the valve cartridge 15 may be coupled to such a spout section, which is in turn pivotally coupled to one or more other spout sections. This exemplary embodiment is distinguished from conventional pot fillers because it does not necessarily include a flow control valve in addition to a mixing valve. Further, the valve cartridge 15 is positioned proximate a dispensing end of the faucet design. According to this exemplary embodiment for a faucet design (e.g., a pot filler design), a user may be able to more easily reach or access a mixing valve to control water temperature.

Referring to FIG. 2, a spout outlet 22 is coupled to a front, second end 14C of the hub 14. The spout outlet 22 includes a generally horizontal portion 22A that extends forward from the second end 14C of the hub 14. The spout outlet 22 also includes a generally vertical portion 22B that is coupled to the lateral portion 22A via an elbow 22C and extends downward from the generally horizontal portion 22A. The vertical portion 22B of the spout outlet 22 is configured to dispense water flowing through the faucet assembly 10A into a sink or other receptacle (not shown). Although not shown, the spout outlet 22 may include an aerator or a pull-down sprayer device. Further, although a spout outlet 22 having lateral and vertical portions 22A, 22B of relative lengths is shown in the FIGURES, it should be understood that a spout outlet may be configured as having shorter or longer vertical and/or lateral portions, according to other exemplary embodiments.

According to an exemplary embodiment, the spout outlet 22 is integrally formed with the hub 14. According to other embodiments, the spout outlet 22 may be produced separately and coupled to the hub 14 in any suitable manner. For example, the spout outlet 22 may be welded, press-fit, or threaded to the second end 14C of the hub 14.

According to an exemplary embodiment, an outlet hole 24 (not shown in FIG. 1, but see, e.g., FIGS. 3-5) is formed within the spout outlet 22 and the hub 14. When the faucet handle 20 is rotated to open water flow between the valve cartridge 15 and the water supply lines 26 (not shown in FIG. 1), water flows from an outlet of the valve cartridge 15 through the outlet hole 24, and out of the vertical portion 22B (e.g., a dispensing end) of the spout outlet 22.

Figure 4:
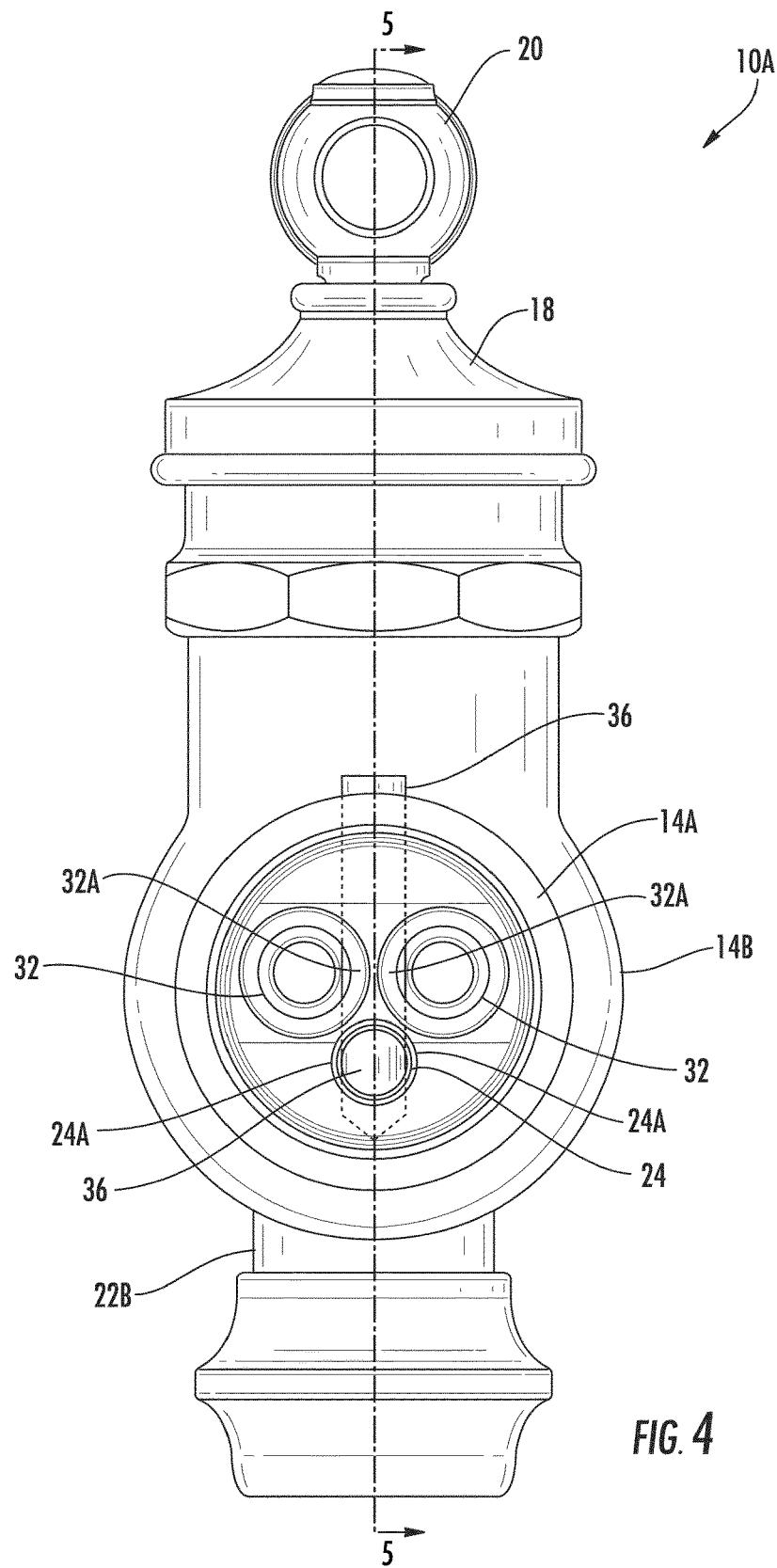
FIG. 4 is a rear plan view of a hub and a spout outlet for the faucet shown in FIG. 2, in which a pin is received within a pin hole according to an exemplary embodiment.
Figure 5:
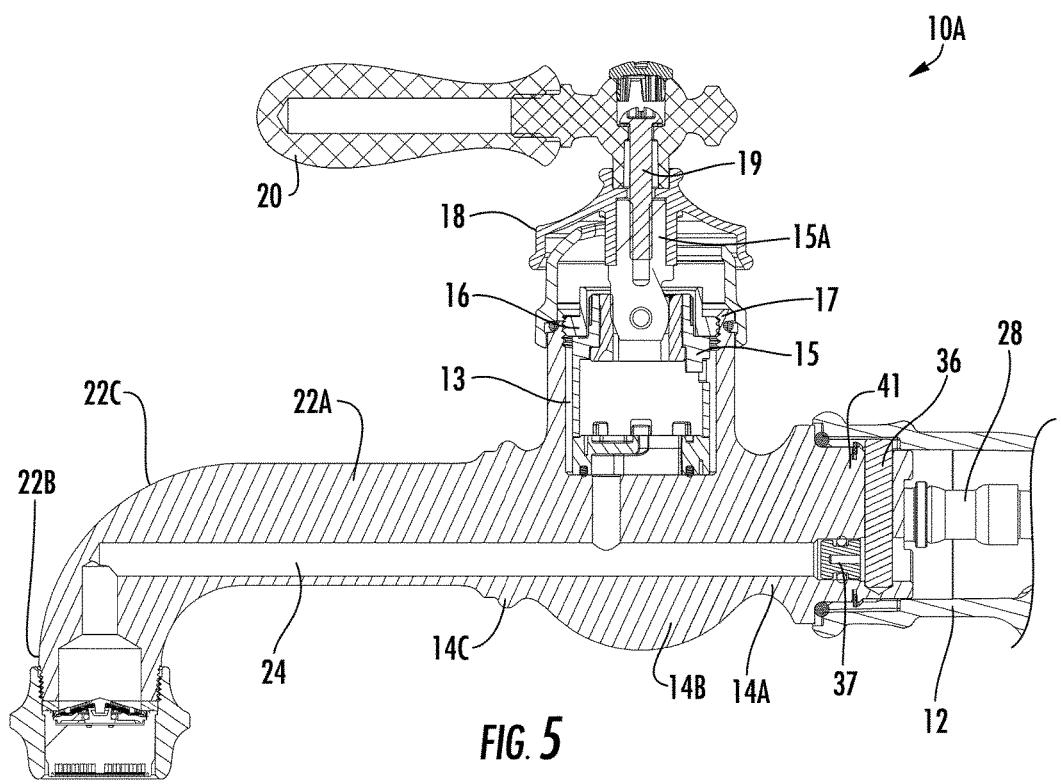
FIG. 5 is a cross-sectional view of the section 5-5 shown in FIG. 4 according to an exemplary embodiment.

Referring to FIGS. 4-5, according to an exemplary embodiment, the outlet hole 24 may be machined through the spout outlet 22 and the hub 14 by drilling a hole within the first end 14A of the hub 14. The outlet hole 24 may extend laterally between the first end 14A of the hub 14, through the bulbous portion 14B, and to the elbow 22C of the spout outlet 22. A vertical hole may be drilled from the dispensing end of the vertical portion 22B to the elbow 22C of the spout outlet 22, and another vertical hole may be drilled through a base of the bore 13 to the lateral portion of the outlet hole 24. As a result, the outlet hole 24 may extend between the first end 14A of the hub 14 to the dispensing end of the spout outlet 22. In other words, the dispensing end of the spout outlet 22 is in fluid communication with the bulbous portion 14B of the hub 14 through the outlet hole 24. According to another exemplary embodiment, the outlet hole 24 is formed (e.g., integrally formed) with the hub 14 and the spout outlet 22 during a molding process, which may advantageously reduce the number of machining and/or manufacturing steps used to make the hub 14. According to other exemplary embodiments, any suitable manufacturing process may be used to form the outlet hole 24, and the processes disclosed herein are not intended to be limiting.

Referring again to FIG. 3, an exploded view of the single-handle faucet assembly 10 is shown. A pair of water supply lines 26 (e.g., a hot water line and a cold water line) are shown as being disposed within the spout base 12 (shown in phantom). According to an exemplary embodiment, the water supply lines 26 may be formed of a polymeric material (e.g., polyethylene, cross-linked polyethylene, polypropylene, etc.), however, the water supply lines 26 may be formed from any suitable material, according to another exemplary embodiment. The water supply lines 26 may be at least somewhat flexible so that they can more easily be fed through the base end 12A and the elbow 12B of the spout base 12. Each water supply line 26 includes a first end that is fluidly coupled to a water supply (not shown), and a second end that is coupled to a connector 28.

According to some exemplary embodiments, each connector 28 may be spun-welded, overmolded, threaded, or integrally formed to a water supply line 26. According to another exemplary embodiment, the connector 28 may be coupled to a water supply line 26 in any suitable manner, and the methods disclosed herein are not intended as limiting. According to an exemplary embodiment, each connector 28 may include one or more circumferential grooves 30 (e.g., recession, slot, etc.), and/or one or more protrusions (not shown, but, e.g., projections, flanges, etc.) which extend radially around a body of each connector 28. The body of each connector 28 may be generally. Each circumferential groove 30 may be configured to receive sealing members (not shown, but, e.g., an o-ring, gasket, etc.) to provide a watertight seal between each connector 28 and the hub 14.

As shown in FIG. 2, each connector 28 is received by an inlet port 32 of the hub 14. Referring now to FIG. 3, the inlet ports 32 are aligned in a horizontal side-by-side relationship according to an exemplary embodiment. Although the inlet ports 32 are shown in FIGS. 2-3 as being in a horizontal, side-by-side relationship, the inlet ports 32 could be disposed within the hub 14 in a different arrangement according to other exemplary embodiments (e.g., vertically side-by-side, etc.).

According to an exemplary embodiment, the inlet ports 32 are disposed above the outlet hole 24, with the outlet hole 24 centered below the inlet ports 32 (when the bore 13 is oriented upwards). According to another exemplary embodiment, the inlet ports 32 are disposed below the outlet hole 24, with the outlet hole 24 centered above the inlet ports 32. For the embodiments in which the outlet hole 24 is centered below or above the inlet ports 32, each inlet port 32 includes an inside portion 32A. The two inside portions 32A are proximate a middle section of the hub 14. Each inside portion 32A is at least somewhat vertically aligned with a respective lateral portion 24A (e.g., a left-side portion and a right-side portions or sections) of the outlet hole 24. The lateral portions 24A are provided on opposite left and right sides of the outlet hole 24. Therefore, when the bore is oriented upwards, a left lateral portion 24A of the outlet hole 24 is vertically aligned underneath the inside portion 32A of one of the inlet ports 32, and the right lateral portion 24A is vertically aligned underneath the inside portion 32A of the other of the two inlet ports 32.

Although not shown in the FIGURES, according to another exemplary embodiment, inlet ports may be arranged vertically side-by-side, with an outlet hole vertically centered on either a left or right side of the inlet ports. For embodiments in which the outlet hole is vertically centered on either a left or right side of the inlet ports, each inlet port may include an inside portion. The two inside portions are proximate a middle section of the hub 14. Each inside portion is at least somewhat vertically aligned with a respective lateral portion (e.g., a left-side portion and a right-side portions or sections). The lateral portions are provided on opposite left and right sides of the outlet hole. Therefore, when the bore is oriented upwards, a left lateral portion of the outlet hole is vertically aligned underneath the inside portion of one of the inlet ports, and the right lateral portion is vertically aligned underneath the inside portion of the other of the two inlet ports.

According to an exemplary embodiment, the inlet ports 32 are in fluid communication with the bore 13. For example, two holes (not shown) may be provided within a floor of the bore 13, and each of these two holes may extend downward to connect with a respective inlet port 32.

According to an exemplary embodiment, each inlet port 32 is configured to include a counterbore. In other words, each inlet port 32 includes a ledge (e.g., an edge, floor, etc.) that extends inwardly within the inlet port 32. The ledge may define a depth of the inlet port 32 (e.g., a depth of the counterbore), and the depth of the counterbore of the inlet ports 32 may be configured to correspond to a length of the connectors 28. Thus, a connector 28 may be fully received within the inlet port 32. Further, an outer diameter of the connector 28 may be slightly smaller than an inner diameter of the inlet port 32 so that the connector may be received within the inlet port 32 and have a snug fit.

According to another exemplary embodiment, a tube (not shown) extends rear of each inlet port 32. According to this exemplary embodiment, the tube of each inlet port 32 is configured to be coupled to a respective water supply line 26. For example, a connector of each water supply line 26 may be configured to receive the tube of a respective inlet port 32.

Referring still to FIG. 2, according to an exemplary embodiment, an aperture or hole 34 is disposed within (e.g., formed in) a top radial surface of the first end of the hub 14. The hole 34 extends downwardly from the radial surface of the hub 14, through side portions of each inlet port 32, through the outlet hole 24, and into a bottom portion of the hub 14. As shown, the hole 34 does not extend all the way through the bottom portion of the hub 14.

Referring now to FIG. 3, according to an exemplary embodiment, a cylindrical pin 36 (e.g., rod, coupler, member, etc.) is configured to be received within the hole 34. According to other embodiments, the pin 36 may have a rectangular or polygonal cross-section. The pin 36 and the hole 34 may be cooperatively configured such that there is a relatively tight tolerance therebetween, to prevent the pin 36 from moving or shifting substantially when received within the hole 34. Further, the pin 36 may be slightly tapered to facilitate insertion of the pin 36 into the hole 34.

According to an exemplary embodiment, the pin 36 is used to perform several functions. Advantageously, because the pin 36 is configured to perform multiple functions, assembly of the faucet spout assembly 10 is greatly simplified. The pin 36 may be formed from a metal, a polymeric material, or any other suitable material.

Referring still to FIG. 3, according to an exemplary embodiment, an outer diameter of the pin 36 and the width of the circumferential grooves 30 are cooperatively configured so that the outer diameter of the pin is at least slightly smaller than the width of the circumferential grooves 30. Thus, the pin 36 and the connectors 28 are cooperatively configured such that when the connectors 28 of two water supply lines 26 are received by the two inlet ports 32, the pin 36 may be received within the hole 34 and fit within the circumferential grooves 30 of the connectors 28. As shown in FIG. 3, a portion of the pin 36 is shown as extending within a portion of each inlet port 32. These portions of the pin 35 which extend within the inlet ports 32 engage the circumferential grooves 30 when the fluid supply lines 26 are coupled to the hub 14. In other words, when the connectors 28 are received within the inlet ports 32 and the pin 36 is inserted into the hole 34, the pin 36 may be pushed downward through the circumferential grooves 30. Therefore, the pin 36 may engage (e.g., abut against) the circumferential grooves 30 of the two connectors 28 to secure (e.g., retain, hold, etc.) the connectors 28 within the inlet ports 32 of the hub 14.

Further referring to FIG. 3, a plug 37 includes a barrel 37A and a sealing member 37B (e.g., an o-ring, gasket, etc.). The barrel 37A includes a circumferential groove, and the sealing member 37B is configured to be received therein. According to an exemplary embodiment, the plug is configured to be received by the first end 14A of the hub 14, and within the outlet hole 24. According to an exemplary embodiment, a watertight seal is provided between the outlet hole 24, the barrel 37A, and the sealing member 37B, when the plug is received within the outlet hole 24. According to another exemplary embodiment, the barrel includes a plurality of circumferential grooves, and a sealing member is received within each groove.

According to another exemplary embodiment, the barrel 37A is formed of a polymeric material (e.g., plastic, rubber, etc.). According to other exemplary embodiments, the barrel 37A is formed from any suitable material (e.g., a composite material, a metal, etc.). According to another exemplary embodiment, the plug is comprised of a single element which is configured to be received within the outlet hole 24, and form a watertight seal therein. For example, the plug may be formed from rubber, silicone, or any other suitable material. The plug may also include a tapered surface that is configured to engage an inner surface of the outlet hole 24 in order to form a watertight seal therebetween.

According to an exemplary embodiment, the plug 37, the pin 36, the hole 34, and the outlet hole 24 are cooperatively configured such that the plug 37 blocks the outlet hole 24 when it is received therein, and the pin 36 secures the plug 37 within the outlet hole 24 when the pin is received within the hole 34 (i.e., lateral movement of the plug 37 out of the outlet hole 24 is prevented by the pin 36, which blocks such movement). Thus, when water flow is open between the valve cartridge 15 and the water supply lines 26, the plug is prevented from being forced backward due to water pressure and water is prevented from flowing backward toward the first end 14A of the hub 14. Advantageously, in this manner, water is prevented from leaking behind the hub 14, and into the spout base 12.

According to another exemplary embodiment, the pin 36 may be engaged with the plug 37 in other ways. For example, a portion of the plug 37 may be pushed within the hole 34. Accordingly, when the pin 36 is received within the hole 34, the pin may engage a radial surface of the plug. The downward pressure of the pin 36 on the plug 37 may be sufficient to overcome water pressure in the outlet hole 24 in order to keep the plug 37 in place. According to another exemplary embodiment, a rear portion of the barrel 37A includes a hole extending at least radially therethrough (not shown). The hole through the barrel 37A may be configured to receive the pin 36.

According to an exemplary embodiment, a length of the pin 36 is greater than a depth of the hole 34. In other words, a portion of the pin 36 is configured to extend out of the hole 34 when the pin 36 is received therein. According to an exemplary embodiment, the portion of the pin 36 that sticks out of the hole 34 may be used to align the hub 14 relative to the spout base 12. For example, referring now to FIG. 8, a slot 40 (e.g., a notch, groove, slot, etc.) may be provided within an upper, vertical portion (e.g., a 12 o'clock portion) of an opening of the elbow 12B. According to an exemplary embodiment, the slot 40 and the pin 36 are cooperatively configured such that the pin 36 may be received within the slot 40. Therefore, the pin 36 and the slot 40 are used to align (e.g., orient) the hub 14 relative to the spout base 12.

According to other exemplary embodiments, the spout base 12 and the hub 14 may be configured in other ways to facilitate relative alignment of these parts. For example, a key (not shown, but, e.g., a protrusion, flange, etc.) may be provided on either an inner radial surface of the spout base 12, or on an outer radial surface of the hub 14. A slot (not shown, but, e.g., a keyed slot, groove, etc.) may be provided on either an inner radial surface of the spout base 12, or on an outer radial surface of the hub 14 (whichever part does not include the key), and the parts having the key may be aligned with the part having the slot. According to another exemplary embodiment, the inlet ports 32, the outlet hole 24, the hole 34, and the slot 40 may be configured in another arrangement, such that the slot 40 is provided on another position within the elbow 12B (e.g., a six o'clock position or any other suitable position), and the pin 36 is configured to be received within the slot 40. It should be understood by those skilled in the art that the hub 14 and the spout base 12 may be configured in other ways to facilitate alignment of each, and that this disclosure does not intend to limit the ways to align a spout base relative to a hub.

According to an exemplary embodiment, the spout base 12 and the first end 14A of the hub 14 are cooperatively configured such that when the first end 14A of the hub 14 is aligned with, and received by the elbow 12B of the spout base 12, the hub 14 extends sufficiently far within the elbow 12B to conceal (e.g., hide) the pin 36 from view. Therefore, advantageously, the pin 36 and the hole 34 do not affect the aesthetics of the faucet assembly 10. Further, the spout base 12, the hub 14, and the pin 36 may be configured such that the pin 36 is engaged by the spout base 12. As a result, the pin 36 is constrained from moving upwards out of the hole 34 when the first end 14A of the hub 14 is received by the elbow 12B.

According to an exemplary embodiment, during assembly of the faucet assembly 10A, the water supply lines 26 are received within the spout base 12 and extend out of the spout base 12 to be coupled to the hub 14. Preferably, the water supply lines 26 are sufficiently long so that during assembly of the faucet assembly 10A, a person can hold onto a portion of the water supply lines 26 behind the connectors 28 to insert the connectors 28 into the inlet ports 32 of the hub 14. When the connectors 28 are received within the inlet ports 32, the pin 36 can be inserted into the hole 34 and engage the circumferential grooves 30. According to an exemplary embodiment, the water supply lines 26 are sufficiently flexible such that once the connectors 28 are secured to the hub 14 via the pin 36, the first end 14A of the hub 14 can be aligned with, and received by the spout base 12. Thus, when the hub 14 is coupled to the spout base 12, the water supply tubes 26 may flex, and move downward within the spout base 12.

According to an exemplary embodiment, a snap-ring 41 is used to couple the hub 14 to the spout base 12. For example, a circumferential groove (not shown) is provided within an outer radial surface of the first end 14A of the hub 14. The snap-ring may be formed from an elastically deformable material, such as spring steel, and the snap-ring is preferably configured to be biased to expand. The snap-ring is configured to compress as the first end 14A of the hub 14 is inserted into the elbow 12B of the spout base 12. Further, the snap-ring is configured to be completely received within the circumferential groove of the hub 14 as the first end 14A of the hub 14 is inserted into the elbow 12B of the spout base 12. According to an exemplary embodiment, an inner radial surface of the elbow 12B includes a circumferential groove (not shown). Further, the circumferential grooves of the hub 14 and the elbow 12B are cooperatively configured such that when the first end 14A of the hub 14 is inserted into the spout base 12 a sufficient distance, the circumferential groove of the elbow 12B will be aligned over the circumferential groove of the hub 14. Once the circumferential grooves are aligned, the snap-ring will automatically spring into an expanded configuration to be received partially within portions of both circumferential grooves. Thus, the hub 14 becomes permanently locked to the spout base 12.

According to an exemplary embodiment, a resilient member 50 (e.g., an o-ring, seal member, etc.) is positioned over the outer radial surfaces of the first end 14A of the hub 14, between the circumferential groove that receives the snap-ring 41 and the bulbous portion 14C of the hub 14. According to an exemplary embodiment, as the elbow 12B is positioned over the first end 14A of the hub 14, the resilient member is compressed. Accordingly, the resilient member 50 exerts an opposing force on the elbow 12B when the elbow 12B is locked onto the first end 14A of the hub 14 via the snap-ring 41. The resilient member 50 provides a permanent load on the snap-ring 41 over the life of the faucet. Therefore, the resilient member 50 is configured to reduce or eliminate any looseness that may otherwise exist between the spout base 12 and the hub 14.

According to another exemplary embodiment, the hub 14 may be coupled to the spout base 12 in any suitable manner. For example, the hub 14 may be coupled to the spout base 12 by using solder, clips, a press fit, or bayonet mounting. Although some methods used to couple a hub to a spout base have been disclosed herein, these methods are not intended to be limiting.

According to another exemplary embodiment, a spout base (not shown) may extend upwardly from a horizontal mounting surface 8 (e.g., a countertop, sink deck, etc.). According to this embodiment, the spout base may be a generally straight tube without an elbow. Further, the straight spout base may be coupled to a hub that includes inlet ports provided on a side that is ninety-degrees relative to a spout outlet. For example, a hub (not shown) may include a bottom end that includes inlet ports and an outlet hole disposed therein, and an adjacent front end (i.e., provided on a surface ninety-degrees relative to the bottom end) which is coupled to a spout outlet. According to this embodiment, a faucet handle may be coupled to any suitable end of the hub (e.g., a top end, a rear end, or side of the hub). Further, the spout base 12 and a straight spout base that extends outwardly from a horizontal mounting surface 8 may be configured in similar ways to couple to a hub (e.g., the hub 14).

According to an exemplary embodiment, a method for assembling a single-handle faucet assembly may include five steps. First, water supply lines 26 are fed through a hole in a mounting surface 8. The water supply lines 26 are then fed through a hole through the spout base 12. The spout base 12 may be secured to the mounting surface 8 before or after the water supply lines 26 are fed therethrough, depending on what may be easier for the user. The plug 37 is used to block the outlet hole 24 and form a watertight seal. The water supply lines 26 are coupled to the hub 14 via the pin 36, and the pin 36 also blocks the plug 37 from being forced rearward by water pressure. Next, the first end 14A of the hub 14 having a snap-ring 41 is inserted into the elbow 12B of the spout base 12 until the snap-ring engages the circumferential groove (not shown) of the spout base 12. Once the snap-ring 41 engages the circumferential groove (not shown) of the spout base 12, the hub 14 is permanently coupled to the spout base 12. That is, according to an exemplary embodiment, the hub 14 and spout base 12 are not designed to be capable of being de-coupled once the snap-ring is engaged with both circumferential grooves of the hub 14 and the spout base 12.

Figure 6:
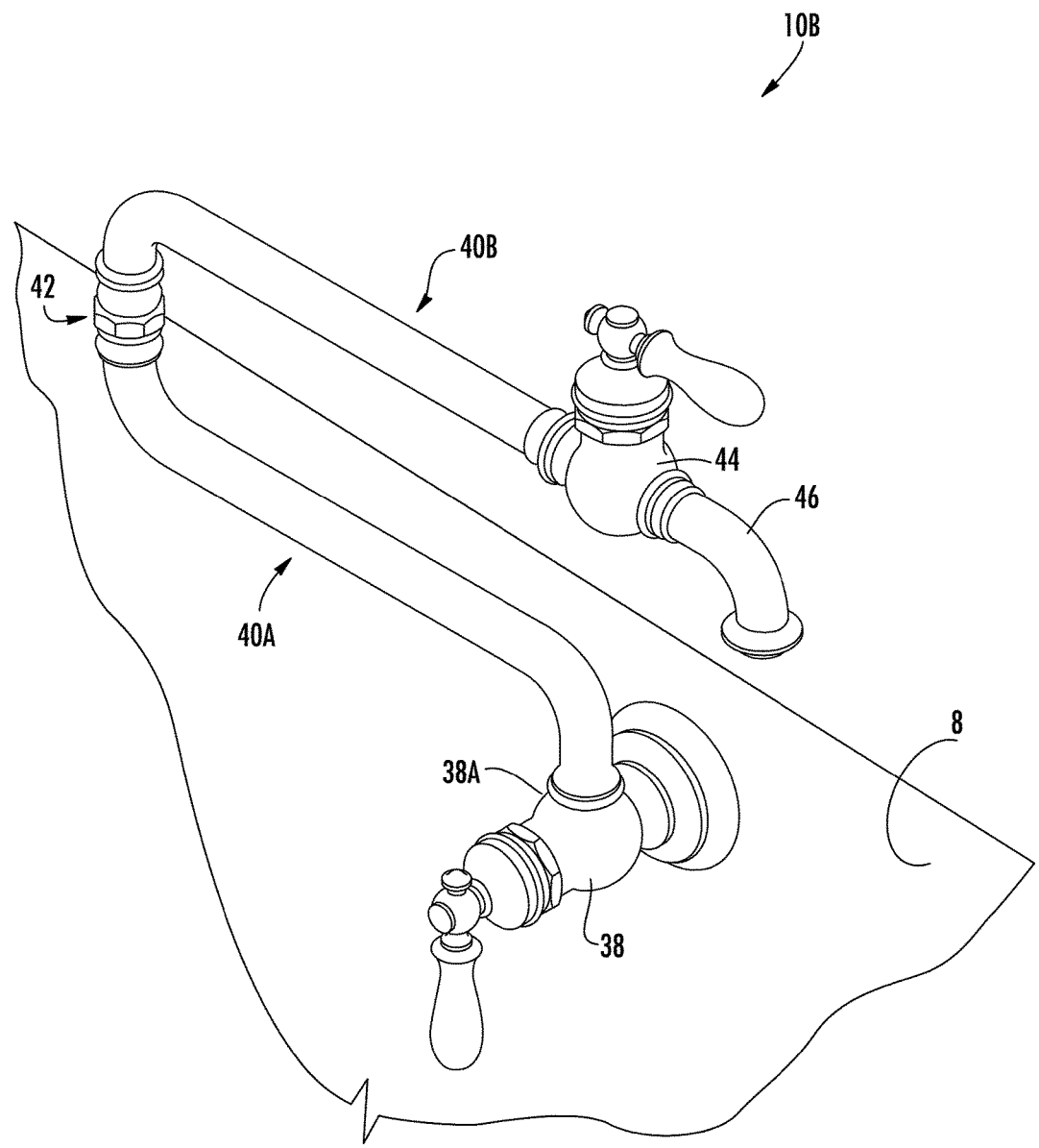
FIG. 6 is a perspective view of a faucet assembly according to another exemplary embodiment.

Referring now to FIG. 6, an exemplary embodiment for another faucet assembly 10B is shown. The faucet assembly 10B includes a hub 38 that may contain (e.g., accommodate, hold, etc.) a flow control valve or a mixing valve (not shown). A rear side of the hub 38 is mounted to a vertical mounting surface 8 (e.g., a wall, sink deck, countertop, etc.). A faucet handle is coupled to a front side of the hub 38, opposite the mounting surface 8. As shown in FIG. 6, an outlet 38A is provided on a top side of the hub 38. A spout section 40A is coupled to the outlet 38A. The spout section 40A includes an arm provided between two ninety-degree elbows. The two elbows are oriented 180 degrees away from each other, such that when the spout section 40A is coupled to the hub 38, one elbow faces downward and the other elbow faces upward. The spout section 40A is configured to pivot about a vertical axis extending through a center of the hub 38. A spout section 40B is coupled to the spout section 40A via a coupler 42 (e.g., a joint, sleeve, adapter, etc). The spout section 40B is shown to include an elbow, which is coupled to the coupler 42. The coupler 42 is configured to allow rotation of the spout sections 40A, 40B relative to each other. A hub 44 is coupled to an end of the spout section 40B opposite the elbow. The hub 44 is configured to contain either a flow control valve or a mixing valve (not shown). In particular, one of the hubs 38, 44 contains a flow control valve, and the other of the hubs 38, 44 contains a mixing valve. A spout outlet 46 extends outwardly from a front side of the hub 44, and a handle is coupled to a top side of the hub 44.

Figure 7:
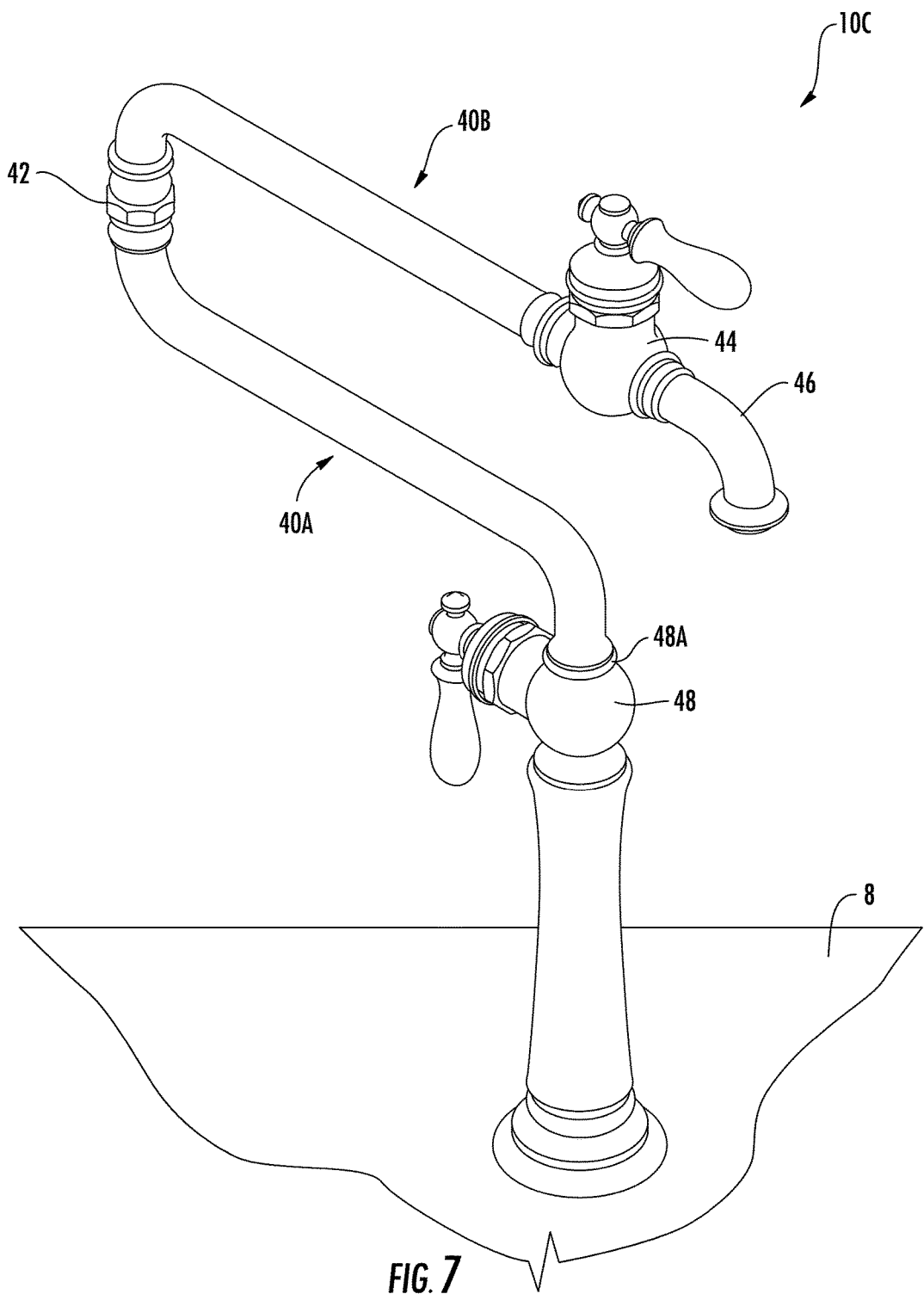
FIG. 7 is a perspective view of a faucet assembly according to another exemplary embodiment.

Referring now to FIG. 7, an exemplary embodiment for another faucet assembly 10C is shown. The faucet assembly 10C shown in FIG. 5 is similar to the faucet assembly 10B shown in FIG. 4, with one primary difference. For the faucet assembly 10B, the outlet 38A of the hub 38 is provided ninety degrees relative to the end of the hub 38 that is mounted to a vertical mounting surface 8. Likewise, the handle coupled to the hub 38 is provided on an opposite side of that is mounted to the vertical mounting surface 8. In contrast, the faucet assembly 10C includes a hub 48 that is coupled to a horizontal mounting surface 8, and the hub 48 includes an outlet 48A that is provided opposite the side that is coupled to the horizontal mounting surface 8. The hub 48 also includes a handle provided on a side that is ninety degrees relative to the side coupled to the horizontal mounting surface 8.

Figure 8:
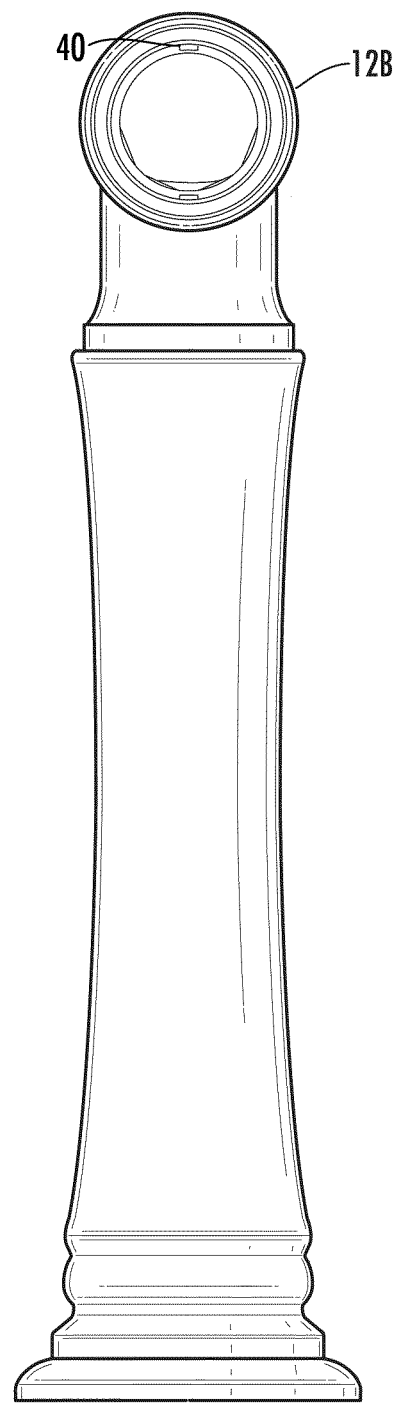
FIG. 8 is a front plan view of the spout base of the faucet assembly shown in FIG. 2 according to an exemplary embodiment.

Although not shown in FIG. 7 or 8, at least one water supply tube may be configured to extend through the spout sections 40A, 40B and the coupler 42. If the hubs 38, 48 include a mixing valve, then only one water supply tube extends through the spout sections 40A, 40B. If the hubs 38, 48 contain a flow control valve, and the hub 44 includes a mixing valve, then two water supply tubes may extend through the spout sections 40A, 40B. Referring to both faucet assemblies 10B, 10C, according to an exemplary embodiment, a similar method that is used to couple the hub 14 of faucet assembly 10A to the spout base 12 may be used to couple the hubs 38, 48 to a spout base or a spout section.

The present application is not intended to be limited to single-handle faucet assemblies. For example, the connection methods disclosed herein may be applicable to dual-handle faucet assemblies, as well as faucet assemblies that include mixing valves. Therefore, dual-handle faucet assemblies and faucet assemblies that include thermostatic mixing valves may include a hub (e.g., a hub similar to the hub 14 shown in FIGS. 2-4) that includes a pin hole (e.g., a pin hole similar to the hole 34). Further, a pin may be used to couple a plurality of water supply lines to a hub. A plug may also be used to block a water outlet hole formed within a hub, and a pin may be used to secure the plug within the outlet hole. A pin may also be used to align a hub relative to a spout body (e.g., a spout base). According to an exemplary embodiment, a dual handle faucet assembly that includes such a pin may also include a mixing valve, or a plurality of valves positioned near a middle portion of the faucet assembly. According to another exemplary embodiment, a faucet assembly that includes such a pin, as well as a mixing valve, may be configured such that the thermostatic valve is positioned near a middle portion of the faucet assembly.

As utilized herein, the terms "approximately," "about," "substantially," "essentially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the single-handle faucet assemblies as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, manufacturing processes, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present disclosure.

What is claimed is:

1. A faucet for mounting to a mounting surface, the faucet comprising:
   a spout base having a first end, a second end, and a first elbow located between the first and second ends, wherein the first end is configured to mount to the mounting surface;
   a hub including a mixing valve, an exterior inlet end coupled to the second end of the spout base, and an exterior outlet end opposite from and coaxial with the exterior inlet end;
   a spout outlet including a first portion extending from the exterior outlet end of the hub, a second portion having a fluid outlet, and a second elbow located between the first and second portions; and
   a plurality of water supply lines received within the spout base and fluidly coupled to the mixing valve through the exterior inlet end of the hub.

2. The faucet of claim 1, wherein the first portion of the spout outlet extends generally horizontally from the exterior outlet end of the hub and the second portion extends generally vertically downward from the first portion when the faucet is mounted to the mounting surface.

3. The faucet of claim 2, wherein the mixing valve is located within a bore in a top portion of the hub.

4. The faucet of claim 3, wherein the top portion includes a cylindrical wall that extends generally vertically upward and an opening at the top to receive the mixing valve therethrough.

5. The faucet of claim 4, further comprising a fastener that threads to the cylindrical wall to secure the mixing valve within the hub.

6. The faucet of claim 5, further comprising a handle coupled to a stem of the mixing valve for controlling a flow rate of water through the mixing valve to the fluid outlet.

7. The faucet of claim 6, further comprising:
   an escutcheon rotatably supporting the handle and closing the opening at the top of the cylindrical wall; and
   a nut coupling the escutcheon to the cylindrical wall.

8. The faucet of claim 1, wherein the hub is located approximately midway between the first elbow and the second elbow.

9. The faucet of claim 1, further comprising a handle coupled to a stem of the mixing valve for controlling a flow rate of water from the plurality of water supply lines to the fluid outlet, wherein the stem extends generally vertically upward when the faucet is mounted to the mounting surface such that the handle is above the hub, the spout base, and the spout outlet.

10. The faucet of claim 9, further comprising a pin to secure each water supply line to the hub by engaging a connector of each water supply line.

11. The faucet of claim 10, wherein the pin extends through an opening in the hub in a direction generally parallel to the stem of the mixing valve.

12. The faucet of claim 10, wherein the pin further secures a plug within an outlet hole fluidly connecting the hub and the spout base, and wherein the plug is configured to prevent water from flowing from the hub back to the spout base.

13. A faucet for mounting to a mounting surface and configured to receive a supply of hot water from a first supply line and a supply of cold water from a second supply line, the faucet comprising:
   a spout base having an inlet section, an outlet section, and a first elbow located between the inlet and outlet sections of the spout base, wherein the inlet section is configured for mounting to the mounting surface;
   a spout outlet including an inlet section, an outlet section having a fluid outlet, and a second elbow located between the inlet and outlet sections of the spout outlet;
   a hub having an exterior inlet end coupled to the outlet section of the spout base and an exterior outlet end that is opposite from and coaxial with the exterior inlet end and is coupled to the inlet section of the spout outlet; and a mixing valve disposed within the hub for receiving the hot water and the cold water and for outputting hot water, cold water, or a mixture thereof to the fluid outlet.

14. The faucet of claim 13, wherein each elbow of the first and second elbows is configured to position the associated outlet section at about ninety degrees relative to the associated inlet section.

15. The faucet of claim 13, wherein the outlet section of the spout base extends along a longitudinal axis and the inlet section of the spout outlet extends along the longitudinal axis.

16. The faucet of claim 13, wherein the mixing valve is received in a bore extending through a top surface of the hub.

17. The faucet of claim 16, further comprising a handle assembly comprising:
   a handle coupled to a stem of the mixing valve for controlling a flow rate of hot water, cold water or a mixture thereof to the fluid outlet;
   an escutcheon rotatably supporting the handle and closing the bore in the top surface of the hub; and
   a fastener coupling the escutcheon to the hub to retain the mixing valve in the bore and to couple the handle assembly to the hub.

18. A faucet for mounting to a mounting surface and configured to receive a supply of hot water from a first supply line and a supply of cold water from a second supply line, the faucet comprising:
   a spout base comprising:
   a first section having an inlet, an outlet, and at least one elbow located between the inlet and the outlet of the first section;
   a second section having an inlet, an outlet, and at least one elbow located between the inlet and the outlet of the second section, wherein the inlet is coupled to the outlet of the first section;
   a hub having an exterior inlet end, which is coupled to the outlet of the second section, and an exterior outlet end, which is opposite from and coaxial with the exterior inlet end;
   a spout outlet including an inlet section, an outlet section having a fluid outlet, and at least one elbow located between the inlet and outlet sections of the spout outlet, wherein the inlet section is coupled to the exterior outlet end of the hub; and
   a first valve disposed within the hub for controlling the flow of water from the hub to the spout outlet.

19. The faucet of claim 18, further comprising a second valve for mounting to the mounting surface, wherein the second valve is coupled to the inlet of the first section of the spout base and controls the flow of water into the spout base.

20. The faucet of claim 19, wherein one of the first and second valves is a flow control valve and the other of the first and second valves is a mixing valve, and wherein the first and second supply lines are configured to be coupled to the mixing valve.

* * * * *